(12) United States Patent
Liu et al.

(10) Patent No.: US 11,956,768 B2
(45) Date of Patent: Apr. 9, 2024

(54) METHOD AND INTEGRATED ACCESS BACKHAUL NODE FOR RESOURCE SCHEDULING

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 17/289,210

(22) PCT Filed: Oct. 30, 2019

(86) PCT No.: PCT/CN2019/114444
§ 371 (c)(1),
(2) Date: Apr. 27, 2021

(87) PCT Pub. No.: WO2020/088546
PCT Pub. Date: May 7, 2020

(65) Prior Publication Data
US 2021/0400682 A1    Dec. 23, 2021

(30) Foreign Application Priority Data
Oct. 30, 2018    (WO) .............. PCT/CN2018/112736

(51) Int. Cl.
*H04W 4/00*       (2018.01)
*H04L 1/1812*     (2023.01)
*H04W 72/12*      (2023.01)

(52) U.S. Cl.
CPC ........... *H04W 72/12* (2013.01); *H04L 1/1812* (2013.01)

(58) Field of Classification Search
None
See application file for complete search history.

(56) References Cited

U.S. PATENT DOCUMENTS

2017/0006499 A1    1/2017    Hampel et al.
2019/0357247 A1*  11/2019    Keskitalo ............. H04W 72/21
2019/0394738 A1*  12/2019    Abedini ............ H04W 74/0833

FOREIGN PATENT DOCUMENTS

CN    107736004 A        2/2018
WO    2018084952 A1      5/2018

OTHER PUBLICATIONS

Extended European Search Report for EP Application No. 19877778.1, dated Jun. 14, 2022, 10 pages.
AT&T, "Summary of 7.2.3.1 Enhancements to support NR backhaul links," 3GPP TSG RAN WG1 Meeting #94, R1-1809941, Gothenburg, Sweden, Aug. 20-24, 2018, 18 pages.

(Continued)

*Primary Examiner* — Zewdu A Beyen
(74) *Attorney, Agent, or Firm* — Sage Patent Group

(57) ABSTRACT

A method and an integrated access backhaul (IAB) node are disclosed for resource scheduling. According to an embodiment, the IAB node determines a first range of scheduling delay such that the first range is different from a second range of scheduling delay determined by a neighboring IAB node having a hop to the IAB node. The IAB node schedules an uplink transmission or downlink reception to occur within the first range.

18 Claims, 5 Drawing Sheets

(56) References Cited

OTHER PUBLICATIONS

International Search Report and Written Opinion of the International Searching Authority for PCT International Application No. PCT/CN2019/11444 dated Feb. 5, 2020.
Nokia, "Resource allocation/coordination between Parent BH and Child links," R1-1810675, 3GPP TSG RAN WG1 Meeting #94bis, Chengdu, China, Oct. 8-12, 2018, 10 pages.
Nokia, "Resource allocation between backhaul and access links," R1-1808580, 3GPP TSG RAN WG1 Meeting #94, Gothenburg, Sweden, Aug. 20-24, 2018, 7 pages.
Ericsson, "Resource allocation and scheduling of IAB networks," R1-1811513, 3GPP TSG RAN WG1 Meeting #94bis, Chengdu, China, Oct. 8-12, 2018, 11 pages.

* cited by examiner

METHOD AND INTEGRATED ACCESS BACKHAUL NODE FOR RESOURCE SCHEDULING

CROSS REFERENCE TO RELATED APPLICATIONS

This application is a 35 U.S.C. § 371 national stage application of PCT International Application No. PCT/CN2019/114444 filed on Oct. 30, 2019, which itself is a continuation of PCT International Application No. PCT/CN2018/112736, filed Oct. 30, 2018, the disclosures and contents of which are incorporated by reference herein in their entireties.

TECHNICAL FIELD

Embodiments of the disclosure generally relate to wireless communication, and, more particularly, to a method and an integrated access backhaul node for resource scheduling.

BACKGROUND

This section introduces aspects that may facilitate better understanding of the present disclosure. Accordingly, the statements of this section are to be read in this light and are not to be understood as admissions about what is in the prior art or what is not in the prior art.

Integrated access backhaul (IAB) is being studied in the 3rd generation partnership project (3GPP). For a new radio (NR) system with IAB capability, an access point can setup a radio connection to another access point in order to reach a donor access point which has a wireline backhaul. The access point may also be referred to as an IAB node (IAB-N) and the radio connection between IAB-Ns may be referred to as wireless backhaul or self-backhaul. FIG. 1 shows an example of an IAB system structure. The donor IAB-N (IAB-N x) has a cable backhaul to the gateway. IAB-N y acts as a bridge node between IAB-N x and IAB-N z. IAB-N y is referred to as the parent IAB-N of IAB-N z and IAB-N z is referred to as the child IAB-N of IAB-N y. In another branch, IAB-N k is connected to IAB-N j and IAB-N j is connected to IAB-N x. Each IAB-N may also have user equipments (UEs) connected to it.

For an IAB-N, there may be three types of links: upstream links to/from the parent IAB-N, downstream links to/from the child IAB-N, and a number of downlink/uplink access links to the served UEs. The first two types of links are also referred to as backhaul links. An IAB system, which comprises a number of IAB-Ns and served UEs, is supposed to handle the resource allocation among these links. There may be different types of resource allocation strategy, such as distributed resource allocation mechanism and centralized resource allocation mechanism. In the distributed resource allocation mechanism, each IAB-N allocates resources among the three types of links by itself with/without coordination between IAB-Ns. In the centralized resource allocation mechanism, a certain control function unit (e.g. a unit located in the donor IAB-N) configures the resource allocation according to the reported information from child IAB-Ns.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for resource scheduling in an IAB system.

According to a first aspect of the disclosure, there is provided a method implemented at an IAB node. The method may comprise determining a first range of scheduling delay such that the first range is different from a second range of scheduling delay determined by a neighboring IAB node having a hop to the IAB node. The method may further comprise scheduling an uplink transmission or downlink reception to occur within the first range.

In an embodiment of the disclosure, the first range and the second range may be non-overlapped with each other.

In an embodiment of the disclosure, the uplink transmission or downlink reception may be scheduled for a terminal device by using a scheduling delay parameter that is configured to enable the terminal device to perform the uplink transmission or downlink reception with a corresponding preparation delay.

In an embodiment of the disclosure, the scheduling delay parameter may be hybrid automatic repeat request (HARQ) delay parameter K2 or K0.

In an embodiment of the disclosure, the first range of scheduling delay may be determined based on an end point of uplink grant transmission or downlink assignment transmission and at least one of a first delay threshold for the IAB node and a second delay threshold for the neighboring IAB node.

In an embodiment of the disclosure, the IAB node may be an outermost leaf node in an IAB route having two or more IAB nodes. The first range may be determined as starting from the end point to the end point plus the first delay threshold.

In an embodiment of the disclosure, the IAB node may be a root node in an IAB route having two or more IAB nodes. The first range may be determined as starting from the end point plus the second delay threshold to infinity.

In an embodiment of the disclosure, the IAB node may be an intermediate node in an IAB route having three or more IAB nodes and the neighboring IAB node may be a child node of the IAB node. The first range may be determined as starting from the end point plus the second delay threshold to the end point plus the first delay threshold.

In an embodiment of the disclosure, the IAB node may be a leaf node in an IAB route. Scheduling the uplink transmission or downlink reception may comprise determining radio resource that has been previously scheduled by a parent node of the IAB node within the first range. Scheduling the uplink transmission or downlink reception may further comprise determining, from unscheduled radio resource within the first range, first radio resource that is to be used for the uplink transmission or downlink reception. Scheduling the uplink transmission or downlink reception may further comprise allocating the first radio resource to the uplink transmission or downlink reception.

In an embodiment of the disclosure, the IAB node may be a root node in an IAB route. Scheduling the uplink transmission or downlink reception may comprise determining, from radio resource within the first range, first radio resource that is to be used for the uplink transmission or downlink reception. Scheduling the uplink transmission or downlink reception may further comprise allocating the first radio resource to the uplink transmission or downlink reception.

In an embodiment of the disclosure, the first delay threshold may be preconfigured in the IAB node or received from a management node. The second delay threshold may be preconfigured in the IAB node or received from the neighboring IAB node.

In an embodiment of the disclosure, the first delay threshold may be preconfigured based on a processing capability of the IAB node.

In an embodiment of the disclosure, the IAB node may be a management node in an IAB route configured to configure delay thresholds for IAB nodes in the IAB route.

In an embodiment of the disclosure, the delay thresholds may be configured blindly or based on processing capabilities of the IAB nodes.

In an embodiment of the disclosure, the delay thresholds may be reconfigured when a number of the IAB nodes in the IAB route is changed.

In an embodiment of the disclosure, the processing capability may comprise one or more of: data processing delay of layers above medium access control (MAC) layer; minimum required time for decoding a physical uplink shared channel (PUSCH); and minimum required time for encoding a physical downlink shared channel (PDSCH).

In an embodiment of the disclosure, the first or second delay threshold may be received or the delay thresholds may be configured by one of: radio resource control (RRC) signaling; MAC control element (CE); and downlink control information (DCI).

In an embodiment of the disclosure, the first range determined for the uplink transmission may be the same or different than the first range determined for the downlink reception.

In an embodiment of the disclosure, the first range determined for the uplink transmission may be larger than the first range determined for the downlink reception.

According to a second aspect of the disclosure, there is provided an IAB node. The IAB node may comprise a processor and a memory. The memory may contain instructions executable by the processor, whereby the IAB node may be operative to determine a first range of scheduling delay such that the first range is different from a second range of scheduling delay determined by a neighboring IAB node having a hop to the IAB node. The IAB node may be further operative to schedule an uplink transmission or downlink reception to occur within the first range.

In an embodiment of the disclosure, the IAB node may be operative to perform the method according to the above first aspect.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided an IAB node. The IAB node may comprise a determination module for determining a first range of scheduling delay such that the first range is different from a second range of scheduling delay determined by a neighboring IAB node having a hop to the IAB node. The IAB node may further comprise a scheduling module for scheduling an uplink transmission or downlink reception to occur within the first range.

According to a sixth aspect of the disclosure, there is provided a method implemented at an IAB node which has a neighboring IAB node having a downstream hop to the IAB node. The method may comprise determining whether at least partial of resources within its range of scheduling delay is scheduled by the neighboring IAB node. The method may further comprise, if at least partial of the resources within its range of scheduling delay is scheduled by the neighboring IAB node, reserving the recourse scheduled by the neighboring IAB node. The method may further comprise scheduling an uplink transmission or downlink reception with the unscheduled resource within its range of scheduling delay.

According to a seventh aspect of the disclosure, there is provided an IAB node. The IAB node may comprise at least one processor and at least one memory. The at least one memory may contain instructions executable by the at least one processor, whereby the IAB node may be operative to determine whether at least partial of resources within its range of scheduling delay is scheduled by a neighboring IAB node having a downstream hop to the IAB node. The IAB node may be further operative to, if at least partial of the resources within its range of scheduling delay is scheduled by the neighboring IAB node, reserve the recourse scheduled by the neighboring IAB node. The IAB node may be further operative to schedule an uplink transmission or downlink reception with the unscheduled resource within its range of scheduling delay.

According to an eighth aspect of the disclosure, there is provided an IAB node. The IAB node may comprise a determination module for determining whether at least partial of resources within its range of scheduling delay is scheduled by the neighboring IAB node. The IAB node may further comprise a reservation module for, if at least partial of the resources within its range of scheduling delay is scheduled by the neighboring IAB node, reserving the recourse scheduled by the neighboring IAB node. The IAB node may further comprise a scheduling module for scheduling an uplink transmission or downlink reception with the unscheduled resource within its range of scheduling delay.

According to some embodiment(s) of the disclosure, a dynamic scheduling solution can be provided to avoid scheduling collisions from neighboring IAB nodes.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
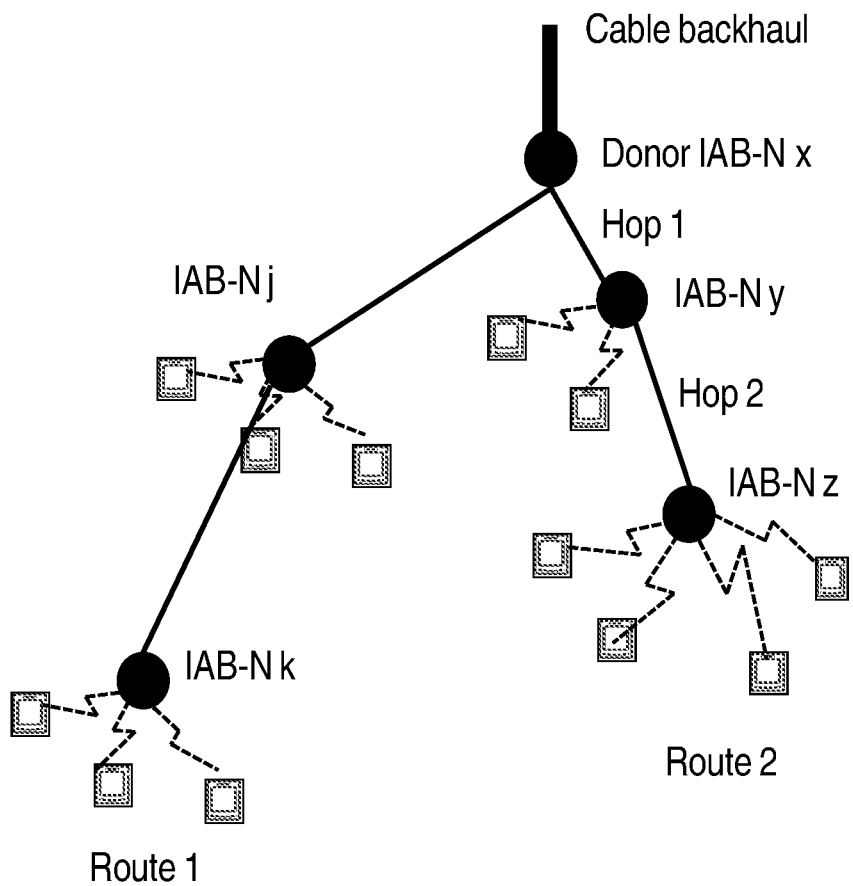
FIG. 1 is a diagram illustrating the structure of an exemplary IAB system.

For the purpose of explanation, details are set forth in the following description in order to provide a thorough understanding of the embodiments disclosed. It is apparent, however, to those skilled in the art that the embodiments may be implemented without these specific details or with an equivalent arrangement.

There are two types of scheduling schemes in NR: dynamic scheduling and semi-persistent scheduling. The semi-persistent scheduling is mentioned only for simplicity and may also be referred to as configured scheduling in NR. For dynamic scheduling, there may be collision occurrence between scheduling decisions by MAC entities of neighboring IAB-Ns, which results in disorder for data transmission/receptions in an IAB system. For semi-persistent scheduling, the uplink or downlink resource pattern between two IAB-Ns of a hop are pre-allocated and scheduling decision collision can be avoided by means of coordination before the pre-allocation. However, resource reservation restricts the resource utilization. That is, such scheduling scheme degrades the spectrum efficiency.

The present disclosure proposes improved solutions for resource scheduling. These solutions may be applied to a wireless communication system including a terminal device and an IAB node. The terminal device can communicate through a radio access communication link with the IAB node. The communications may be performed between the terminal device and the IAB node according to any suitable communication standards and protocols. The terminal device may also be referred to as, for example, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

To facilitate understanding of the present disclosure, delay parameters of HARQ in NR will be introduced first. In NR, one common network should be able to serve multiple services of deviated quality of service (QoS) requirements and HARQ configuration shall be able to fulfill different delay requirements. In NR, one common scheduling signaling mechanism, which is applicable for both time division duplexing (TDD) and frequency division duplexing (FDD), has been defined. Meanwhile, the common scheduling mechanism should also be applicable for UEs of different signal processing delay capability (physical uplink shared channel (PUSCH) preparation delay and physical downlink shared channel (PDSCH) reception delay). According to the scheduling mechanism, the scheduling signaling design in NR provides sufficient flexibility so that the next-generation node B (gNB) can configure different delay parameters to balance multiple factors such as delay requirements of different services, UE capabilities, (TDD/FDD) duplexing mode and spectrum efficiency.

Figure 2:
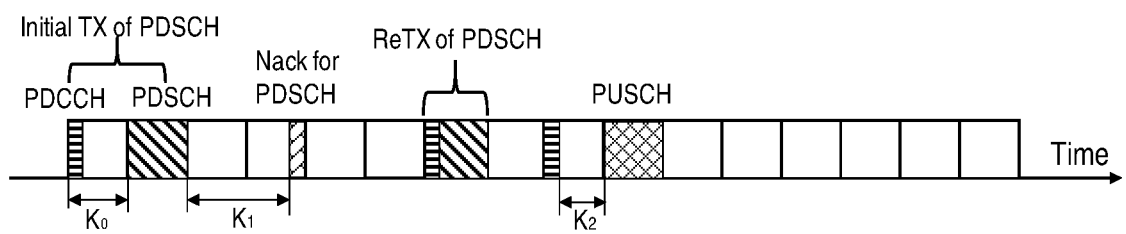
FIG. 2 is a diagram illustrating some HARQ delay parameters.

There are three delay parameters K0, K1 and K2 which may be relevant to the prevent disclosure. As shown in FIG. 2, K0 is the delay between downlink (DL) grant and corresponding DL data (PDSCH) reception. K1 is the delay between DL data (PDSCH) reception and corresponding acknowledgement transmission on uplink (UL). K2 is the delay between UL grant reception in DL and UL data (PUSCH) transmission.

The description on how to apply K0 parameter in UE side for PDSCH reception is described in Section 5.1.2.1 of 3GPP technical specification (TS) 38.213-f30. Either a default PDSCH time domain allocation A, B or C according to tables 5.1.2.1.1-2, 5.1.2.1.1-3, 5.1.2.1.1-4 and 5.1.2.1.1-5 is applied, or the higher layer configured pdsch-TimeDomainAllocationList in either pdsch-ConfigCommon or pdsch-Config is applied. As mentioned in this technical specification, when the UE is scheduled to receive PDSCH by a downlink control information (DCI), the Time domain resource assignment field value m of the DCI provides a row index m+1 to an allocation table. The determination of the used resource allocation table is defined in sub-clause 5.1.2.1.1. The indexed row defines the slot offset $K_0$, the start and length indicator SLIV, or directly the start symbol S and the allocation length L, and the PDSCH mapping type to be assumed in the PDSCH reception.

The candidate values for K1 seem still being discussed. K1 can also be indicated in DCI for PDSCH scheduling. In 3GPP TS 38.331-f30, a field in PUCCH-Config information element (IE) is defined to configure the candidate values for K1:

```
PUCCH-Config : : =        SEQUENCE {
    ...
    dl-DataToUL-ACK       SEQUENCE (SIZE (1..8)) OF INTEGER
                          (0..15)
OPTIONAL,    -- Need M
}
```

In Section 6.1.2.1 of 3GPP TS 38.213-f30, the procedure on applying K2 for uplink scheduling is specified. Default mapping table for K2 was defined. Either a default PUSCH time domain allocation A according to table 6.1.2.1.1-2, is applied, or the higher layer configured pusch-TimeDomainAllocationList in either pusch-ConfigCommon or pusch-Config is applied. Via pusch-ConfigCommon or pusch-Config IE, the gNB can configure candidate K2 parameter values other than those provided by the table 6.1.2.1.1-2.

Now, several embodiments will be described to explain the solutions of the present disclosure. As the first embodiment, differentiated delay ranges (e.g. using the HARQ delay parameter k0 or k2) for scheduled transmission/reception may be configured between two IAB-Ns of a hop in order to avoid scheduling collisions. According to the delay ranges, a child IAB-N may determine the resources that are not scheduled within its delay range by its parent IAB-N, and schedule transmission/reception using these unscheduled resources accordingly. As mentioned hereinbefore, the resources scheduled by an IAB node may be used for communications between IAB nodes and communications between the IAB node and UEs.

Figure 3:
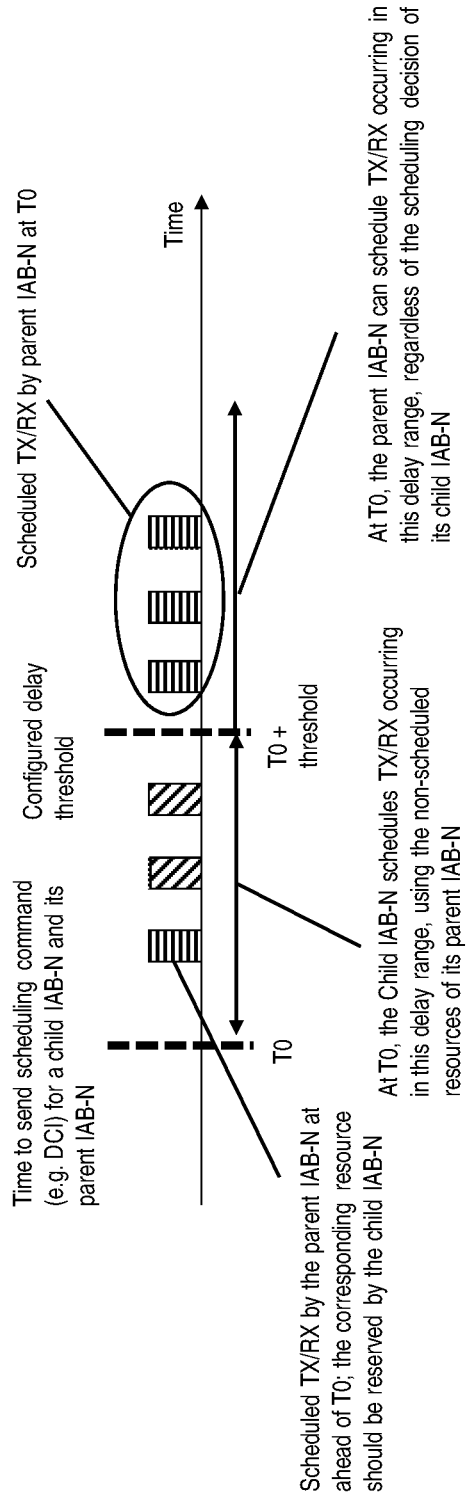
FIG. 3 is a diagram illustrating the first embodiment of the disclosure.

FIG. 3 illustrates an example for the first embodiment. As shown, a delay threshold x time units (e.g. microseconds, milliseconds, orthogonal frequency division multiplexing (OFDM) symbols, slots, subframes or radio frames) may be preconfigured for a parent IAB-N and its child IAB-N of a hop. The parent IAB-N may schedule an uplink transmission or downlink reception such that it occurs a threshold time units later, using k2 or k0 parameter. That is, the delay range for the parent IAB-N may be determined as being greater than T0+threshold. T0 is any time point at which a scheduling command (e.g. DCI) is to be sent for the child IAB-N and the parent IAB-N. This means a dynamic scheduling method can be provided to enhance spectrum efficiency and adapt (e.g. rank, frequency selection, modulation and coding scheme (MCS), retransmission) to channel variation better than semi-persistent scheduling. In the example shown in FIG. 3, there are only two IAB-Ns, which means the parent node is the donor IAB-N. Thus, at T0, the parent IAB-N can schedule a transmission/reception to occur within its delay range regardless of the scheduling decision of its child IAB-N.

The child IAB-N may schedule an uplink or downlink transmission such that it occurs within the threshold time units, using k2 or k0 parameter. That is, the delay range for the child IAB-N may be determined as (T0, T0+threshold]. During scheduling, the child IAB-N shall reserve the radio resources that are already scheduled by its parent IAB-Ns (e.g. the scheduled transmission/reception by the parent IAB-N at ahead of T0), such that these scheduled radio resources are not to be scheduled by its own transmission/reception.

Figure 4:
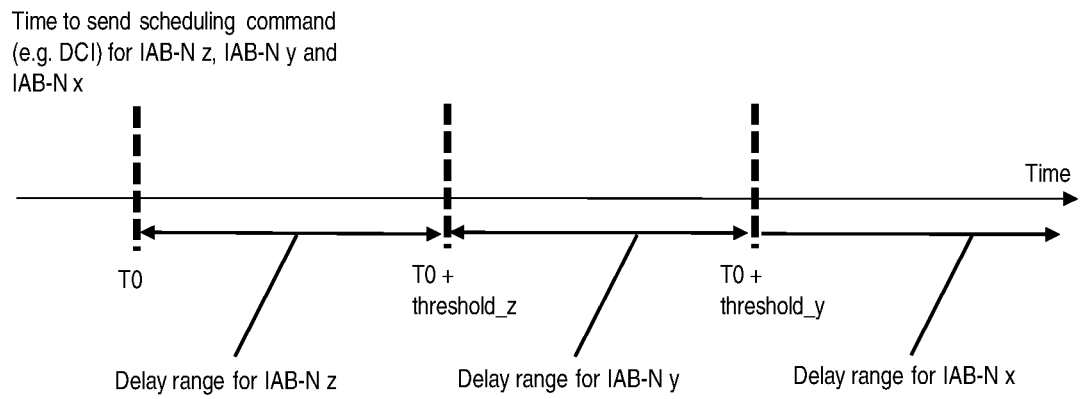
FIG. 4 is a diagram illustrating the second embodiment of the disclosure.

As the second embodiment, when there are multiple hops which form a route, the coordination of delay parameters for scheduling occurs between the IAB-Ns along the whole route. The delay ranges for scheduling by different IAB-Ns in one route may be non-overlapped in order to avoid scheduling collision among these IAB-Ns. Take the right route in FIG. 1 as an example. For any time point T0 for scheduling command (e.g. DCI) transmission, IAB-Nz can only schedule transmission/reception occurring between T0 and T0+threshold_z. That is, the delay range for IAB-Nz is (T0, T0+threshold_z], as shown in FIG. 4. IAB-Ny can only schedule transmission/reception occurring between T0+threshold_z and T0+threshold_y. That is, the delay range for IAB-Ny is (T0+threshold_z, T0+threshold_y], where threshold_y>threshold_z. IAB-Nx can only schedule transmission/reception occurring later than T0+threshold_y. That is, the delay range for IAB-Nx is greater than T0+threshold_y. Note that similar to the first embodiment, if some radio resources within the range (T0, T0+threshold_z] are already scheduled by IAB-Nx at ahead of T0, IAB-Nz shall reserve these radio resources.

As an option, an IAB node may listen to all DCI signaling messages issued by its neighboring nodes in order to know the delay ranges/durations are being used/applied by its neighboring nodes. As another option, the IAB node may exchange information on the delay parameters that are being used/applicable for the current/upcoming transmissions/receptions.

In the above first and second embodiments, HARQ timing or delay parameters (such as k0, k1 and k2) are used to improve collision avoidance between scheduling decisions made by neighboring IAB-Ns. By well dimensioned ranges for HARQ delay parameters among neighboring nodes, the neighboring IAB-Ns can perform dynamic scheduling according to these HARQ delay parameters without collision. However, the principle of the present disclosure can also be applicable to a mesh networking scenario where other radio access technologies (RATs) are scheduled in a coordinated fashion, although the scheduling delay parameters (i.e. parameters for indicating the time to transmission or reception opportunity occurrence) may be named differently in other RATs, regardless if the HARQ operation is supported or not in that RAT.

As the third embodiment, upon determination of the respective delay ranges for scheduling of two IAB-Ns of a hop, the node processing capabilities of the IAB-Ns may be considered such that the configured delay range for scheduling can be applicable for an IAB-N. As an example, the minimum required time for decoding a PUSCH and/or the minimum required time for encoding a PDSCH may be considered. As another example, the data processing delay of upper layers (e.g. the layers above MAC layer) of an IAB-N may be considered.

As the fourth embodiment, a coordination manager may be supported to handle the delay range dimension for an IAB route. The coordination manager may be a logical node which may be located in the donor IAB-N, a separate node or an operation administration and maintenance (OAM) system. The coordination manager may either blindly dimension the delay range for scheduling per IAB-N in the IAB route or based on the collected signal processing capabilities of the IAB-Ns in the IAB route.

As the fifth embodiment, either the same or differentiated delay ranges may be applied for uplink scheduling and downlink scheduling. If differentiated delay ranges are applied between uplink scheduling and downlink scheduling, the delay range for uplink scheduling may be larger with a positive offset to the delay range of downlink scheduling to cover the PUSCH preparation time from the end of UL grant reception to the encoding finish.

As the sixth embodiment, either RRC signaling, MAC control element (CE) or other signaling may be used to configure/exchange the delay ranges. As the seventh embodiment, when a route is extended due to the joining of a new child IAB-N or shortened due to the leaving of an existing IAB-N, the delay ranges of the existing IAB-Ns in the route may be reconfigured.

Figure 5:
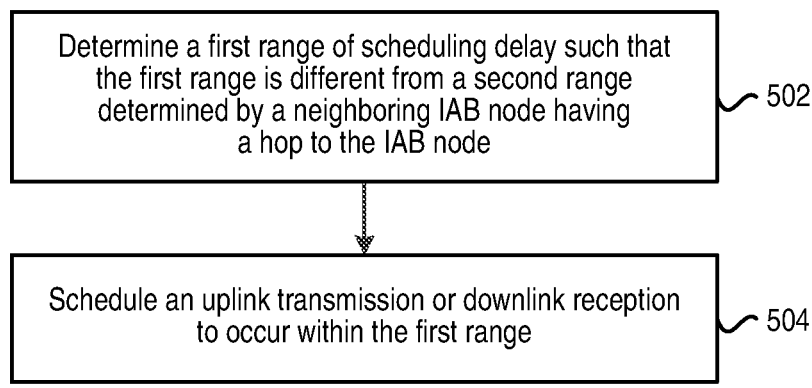
FIG. 5 is a flowchart illustrating a method implemented at an IAB node according to an embodiment of the disclosure.

Hereinafter, the solutions of the disclosure will be further described with reference to FIGS. 5-9. FIG. 5 is a flowchart illustrating a method implemented at an IAB node according to an embodiment of the disclosure. At block 502, a first range of scheduling delay is determined such that the first range is different from a second range of scheduling delay determined by a neighboring IAB node having a hop to the IAB node. Since the first and second ranges are different from each other, scheduling collisions from neighboring IAB-Ns can be avoided. The scheduling delay may refer to the time from an issuance of a scheduling command (or the end of uplink grant transmission or downlink assignment transmission) to an occurrence of an uplink transmission or downlink reception instructed by the scheduling command Note that the grant means uplink grant and the assignment means downlink assignment in the present disclosure.

As an example, the first range and the second range may be non-overlapped with each other. The first range of scheduling delay may be determined based on an end point of uplink grant transmission or downlink assignment transmission and at least one of a first delay threshold for the IAB node and a second delay threshold for the neighboring IAB node. Note that the first range determined for the uplink transmission may be the same or different than the first range determined for the downlink reception. For example, the first range determined for the uplink transmission may be larger than the first range determined for the downlink reception.

In the case that the IAB node is an outermost leaf node in an IAB route having two or more IAB nodes, the first range may be determined as starting from the end point to the end point plus the first delay threshold. The outermost leaf node refers to a node which has no child node in the IAB route. For instance, the child IAB-N shown in FIG. 3 is an outermost leaf node and the delay range for it may be determined as (T0, T0+threshold]. IAB-Nz shown in FIG. 4 is also an outermost leaf node and the delay range for it may be determined as (T0, T0+threshold_z].

In the case that the IAB node is a root node in an IAB route having two or more IAB nodes, the first range may be determined as starting from the end point plus the second delay threshold to infinity. The root node (or donor node) refers to a node which has no parent node in the IAB route. For instance, the parent IAB-N shown in FIG. 3 is a root node and the delay range for it may be determined as being greater than T0+threshold. IAB-Nx shown in FIG. 4 is also a root node and the delay range for it may be determined as being greater than T0+threshold_y.

In the case that the IAB node is an intermediate node in an IAB route having three or more IAB nodes and the neighboring IAB node is a child node of the IAB node, the first range may be determined as starting from the end point plus the second delay threshold to the end point plus the first delay threshold. For instance, IAB-Ny shown in FIG. 4 is an intermediate node and the delay range for it may be determined as (T0+threshold_z, T0+threshold_y].

As an option, the first delay threshold may be preconfigured in the IAB node or received from a management node. The management node may be any node in the IAB route or an OAM node. The first delay threshold may be preconfigured based on the processing capability of the IAB node. For example, the processing capability may comprise one or more of: data processing delay of layers above MAC layer; minimum required time for decoding a PUSCH; and minimum required time for encoding a PDSCH. The second delay threshold may be preconfigured in the IAB node or received from the neighboring IAB node. Similarly, the second delay threshold may be preconfigured based on the processing capability of the neighboring IAB node. The first or second delay threshold may be received by RRC signaling, MAC control element (CE), downlink control information (DCI), or any other suitable signaling.

As another option, the IAB node may be a management node in an IAB route configured to configure delay thresholds for IAB nodes in the IAB route. The delay thresholds may be configured blindly or based on processing capabilities of the IAB nodes. The delay thresholds may be configured by RRC signaling, MAC CE, DCI, or any other suitable signaling. The delay thresholds may be reconfigured when the number of the IAB nodes in the IAB route is changed.

At block 504, an uplink transmission or downlink reception is scheduled to occur within the first range. The uplink transmission or downlink reception may be scheduled by the IAB node for the connected terminal devices or its child IAB node(s). The uplink transmission or downlink reception may be scheduled for a terminal device by using a scheduling delay parameter. The scheduling parameter is configured to enable the terminal device to perform the uplink transmission or downlink reception with a corresponding preparation delay. As an exemplary example, the scheduling delay parameter may be HARQ delay parameter K2 or K0. Note that the present disclosure can also be applicable to a mesh networking scenario where other RATs are scheduled in a coordinated fashion, although the scheduling delay parameter may be named differently in other RATs, regardless if the HARQ operation is supported or not in that RAT.

Figure 6:
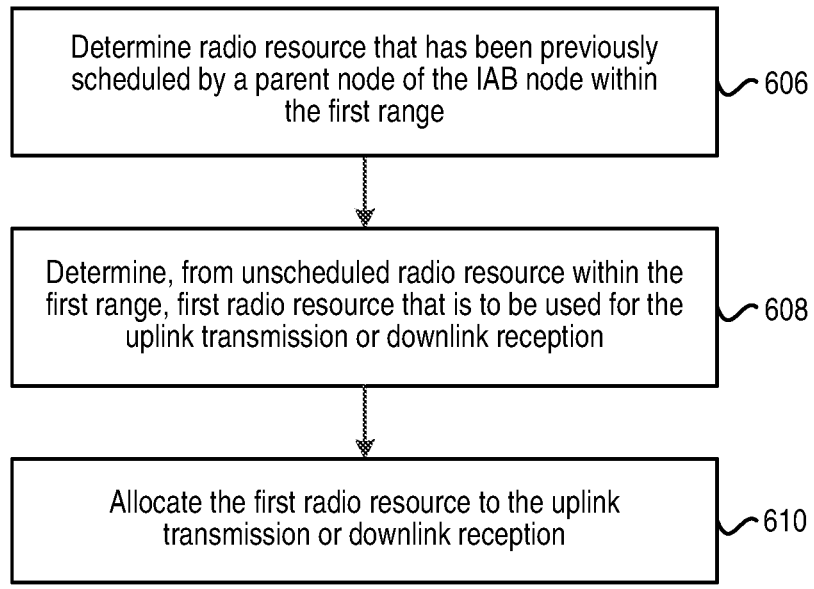
FIG. 6 is a flowchart for explaining the method of FIG. 5.

In the case that the IAB node is a leaf node in an IAB route, block 504 may be implemented as blocks 606-610 of FIG. 6. At block 606, the IAB node determines radio resource that has been previously scheduled by a parent node of the IAB node within the first range. For example, the previously scheduled radio resource by the parent node may be determined based on PDCCH received from the parent node. At block 608, the IAB node determines, from unscheduled radio resource within the first range, first radio resource that is to be used for the uplink transmission or downlink reception. At block 610, the IAB node allocates the first radio resource to the uplink transmission or downlink reception. The first radio resource may be allocated by sending a scheduling command (e.g. uplink grant or downlink assignment) on PDCCH. The scheduling command may include the corresponding HARQ delay parameter K2 or K0.

Figure 7:
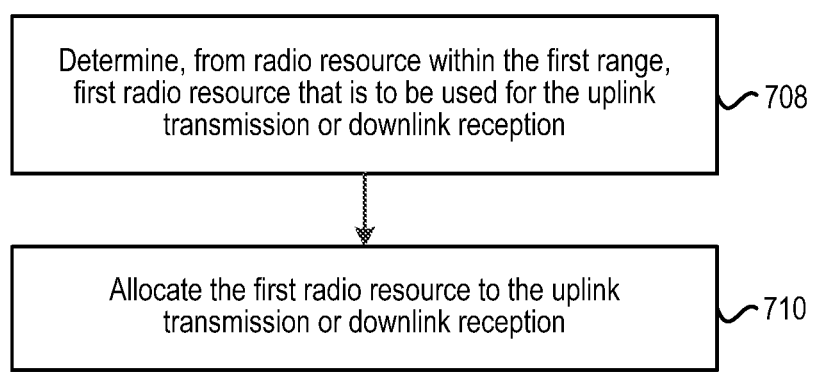
FIG. 7 is a flowchart for explaining the method of FIG. 5.

In the case that the IAB node is a root node in an IAB route, block 504 may be implemented as blocks 708-710 of FIG. 7. At block 708, the IAB node determines, from radio resource within the first range, first radio resource that is to be used for the uplink transmission or downlink reception. At block 710, the IAB node allocates the first radio resource to the uplink transmission or downlink reception. Block 710 may be similar to block 610 and its details are omitted here. It should be noted that two blocks shown in succession in the figures may, in fact, be executed substantially concurrently, or the blocks may sometimes be executed in the reverse order, depending upon the functionality involved.

Based on the above description, in at least one aspect, the present disclosure provides a method implemented at an IAB node which has a neighboring IAB node having a downstream hop to the IAB node. The method may comprise determining whether at least partial of resources within its range of scheduling delay is scheduled by the neighboring IAB node. The method may further comprise, if at least partial of the resources within its range of scheduling delay is scheduled by the neighboring IAB node, reserving the recourse scheduled by the neighboring IAB node. The method may further comprise scheduling an uplink transmission or downlink reception with the unscheduled resource within its range of scheduling delay.

Figure 8:
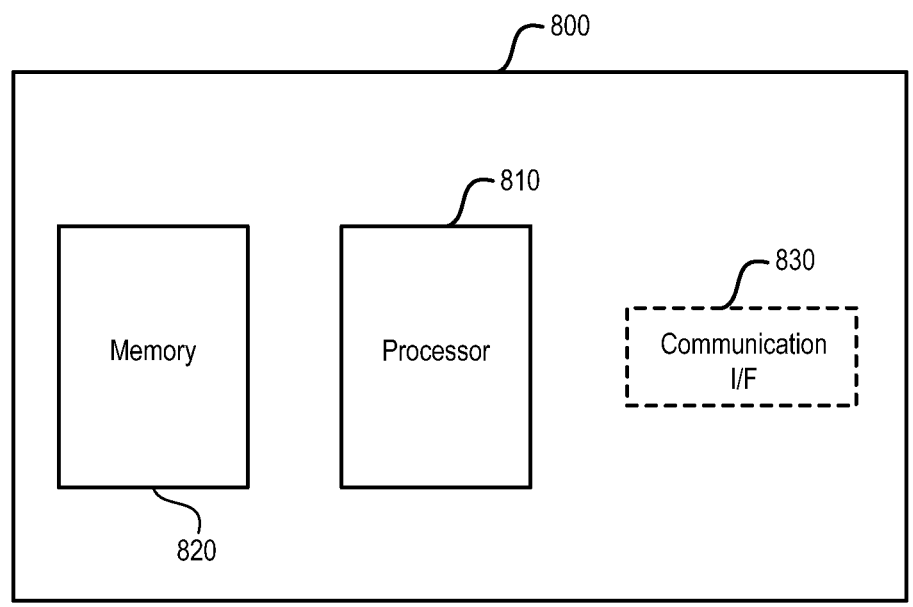
FIG. 8 is a block diagram showing an apparatus suitable for use in practicing some embodiments of the disclosure.

FIG. 8 is a block diagram showing an apparatus suitable for use in practicing some embodiments of the disclosure. For example, the IAB node described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
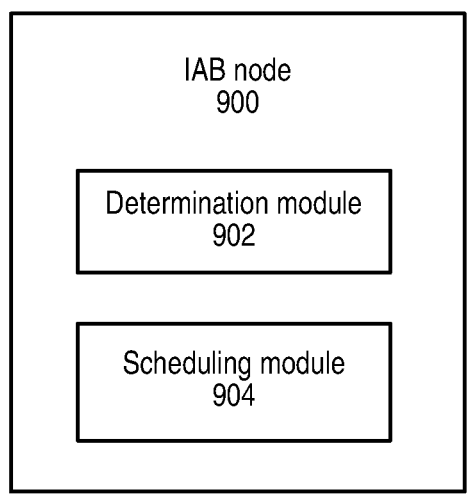
FIG. 9 is a block diagram showing an IAB node according to an embodiment of the disclosure.

FIG. 9 is a block diagram showing an IAB node according to an embodiment of the disclosure. As shown, the IAB node 900 comprises a determination module 902 and a scheduling module 904. The determination module 902 may be configured to determine a first range of scheduling delay such that the first range is different from a second range of scheduling delay determined by a neighboring IAB node having a hop to the IAB node, as described above with respect to block 502. The scheduling module 904 may be configured to schedule an uplink transmission or downlink reception to occur within the first range, as described above with respect to block 504.

According to another embodiment, the present disclosure provides an IAB node. The IAB node may comprise a determination module, a reservation module and a scheduling module. The determination module may be configured to determine whether at least partial of resources within its range of scheduling delay is scheduled by the neighboring IAB node. The reservation module may be configured to, if at least partial of the resources within its range of scheduling delay is scheduled by the neighboring IAB node, reserve the recourse scheduled by the neighboring IAB node. The scheduling module may be configured to schedule an uplink transmission or downlink reception with the unscheduled resource within its range of scheduling delay. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at an integrated access backhaul, IAB, node, the method comprising:
   determining a first range of scheduling delay wherein the first range is different from a second range of scheduling delay determined by a neighboring IAB node having a hop to the IAB node, wherein the first range of scheduling delay is determined based on an end point of uplink grant transmission or downlink assignment transmission and at least one of a first delay threshold for the IAB node and a second delay threshold for the neighboring IAB node, wherein the first delay threshold is preconfigured in the IAB node or received from a management node, and wherein the second delay threshold is preconfigured in the IAB node or received from the neighboring IAB node; and scheduling an uplink transmission or downlink reception to occur within the first range.

2. The method according to claim 1, wherein the first range and the second range are non-overlapped with each other.

3. The method according to claim 1, wherein the uplink transmission or downlink reception is scheduled for a terminal device by using a scheduling delay parameter that is configured to enable the terminal device to perform the uplink transmission or downlink reception with a corresponding preparation delay.

4. The method according to claim 3, wherein the scheduling delay parameter is hybrid automatic repeat request, HARQ, delay parameter K2 or K0.

5. The method according to claim 1, wherein the IAB node is an outermost leaf node in an IAB route having two or more IAB nodes; and
    wherein the first range is determined as starting from the end point to the end point plus the first delay threshold.

6. The method according to claim 1, wherein the IAB node is a root node in an IAB route having two or more IAB nodes; and
    wherein the first range is determined as starting from the end point plus the second delay threshold to infinity.

7. The method according to claim 1, wherein the IAB node is an intermediate node in an IAB route having three or more IAB nodes and the neighboring IAB node is a child node of the IAB node; and
    wherein the first range is determined as starting from the end point plus the second delay threshold to the end point plus the first delay threshold.

8. The method according to claim 1, wherein the IAB node is a leaf node in an IAB route; and
    wherein scheduling the uplink transmission or downlink reception comprises:
    determining radio resource that has been previously scheduled by a parent node of the IAB node within the first range;
    determining, from unscheduled radio resource within the first range, first radio resource that is to be used for the uplink transmission or downlink reception; and
    allocating the first radio resource to the uplink transmission or downlink reception.

9. The method according to claim 1, wherein the IAB node is a root node in an IAB route; and
    wherein scheduling the uplink transmission or downlink reception comprises:
    determining, from radio resource within the first range, first radio resource that is to be used for the uplink transmission or downlink reception; and
    allocating the first radio resource to the uplink transmission or downlink reception.

10. The method according to claim 1, wherein the first delay threshold is preconfigured based on a processing capability of the IAB node.

11. The method according to claim 10, wherein the processing capability comprises one or more of:
    data processing delay of layers above medium access control, MAC, layer;
    minimum required time for decoding a physical uplink shared channel, PUSCH; and
    minimum required time for encoding a physical downlink shared channel, PDSCH.

12. The method according to claim 1, wherein the IAB node is a management node in an IAB route configured to configure delay thresholds for IAB nodes in the IAB route.

13. The method according to claim 12, wherein the delay thresholds are configured blindly or based on processing capabilities of the IAB nodes; or
    the delay thresholds are reconfigured when a number of the IAB nodes in the IAB route is changed.

14. The method according to claim 1, wherein the first or second delay threshold is received or the delay thresholds are configured by one of:
    radio resource control, RRC, signaling;
    MAC control element, CE; and
    downlink control information, DCI.

15. The method according to claim 1, wherein the first range determined for the uplink transmission is the same or different than the first range determined for the downlink reception.

16. The method according to claim 15, wherein the first range determined for the uplink transmission is larger than the first range determined for the downlink reception.

17. An integrated access backhaul, IAB, node comprising:
    at least one processor; and
    at least one memory, the at least one memory containing instructions executable by the at least one processor, whereby the IAB node is operative to:
    determine a first range of scheduling delay wherein the first range is different from a second range of scheduling delay determined by a neighboring IAB node having a hop to the IAB node, wherein the first range of scheduling delay is determined based on an end point of uplink grant transmission or downlink assignment transmission and at least one of a first delay threshold for the IAB node and a second delay threshold for the neighboring IAB node, wherein the first delay threshold is preconfigured in the IAB node or received from a management node, and wherein the second delay threshold is preconfigured in the IAB node or received from the neighboring IAB node; and
    schedule an uplink transmission or downlink reception to occur within the first range.

18. A method implemented at an integrated access backhaul, IAB, node, which has a neighboring IAB node having a downstream hop to the IAB node, the method comprising:
    determining whether at least partial of resources within the IAB node range of scheduling delay is scheduled by the neighboring IAB node, wherein the IAB node range of scheduling delay is determined based on an end point of uplink grant transmission or downlink assignment transmission and at least one of a first delay threshold for the IAB node and a second delay threshold for the neighboring IAB node, wherein the first delay threshold is preconfigured in the IAB node or received from a management node, and wherein the second delay threshold is preconfigured in the IAB node or received from the neighboring IAB node;
    if at least partial of the resources within the IAB node range of scheduling delay is scheduled by the neighboring IAB node, reserving the recourse scheduled by the neighboring IAB node; and
    scheduling an uplink transmission or downlink reception with the unscheduled resource within the IAB node range of scheduling delay.

* * * * *